US006598138B1

United States Patent

(12) United States Patent
Marik et al.

(10) Patent No.: US 6,598,138 B1
(45) Date of Patent: Jul. 22, 2003

(54) METHOD FOR CONTROLLING THE ASSIGNMENT OF MEMORY ACCESS

(75) Inventors: Wolfgang Marik, Vienna (AT); Friedrich Eppensteiner, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/720,759

(22) PCT Filed: Jul. 1, 1999

(86) PCT No.: PCT/DE99/01955

§ 371 (c)(1), (2), (4) Date: Dec. 28, 2000

(87) PCT Pub. No.: WO00/02133

PCT Pub. Date: Jan. 13, 2000

(30) Foreign Application Priority Data

Jul. 3, 1998 (DE) ........................................ 198 29 838

(51) Int. Cl.$^{7}$ .......................... G06F 12/02; G06F 13/16

(52) U.S. Cl. ........................ 711/167; 711/154; 711/170

(58) Field of Search ............................ 711/3, 118, 154, 711/167, 168, 170, 169

(56) References Cited

U.S. PATENT DOCUMENTS 4,449,183 A 5/1984 Flahive et al.
4,627,018 A 12/1986 Trost et al.
5,301,282 A 4/1994 Amini et al.
5,640,518 A 6/1997 Muhich et al.
5,913,222 A * 6/1999 Liedtke ......................... 711/3
6,178,486 B1 * 1/2001 Gill et al. ................... 711/151
6,205,524 B1 * 3/2001 Ng ............................ 711/151
6,282,505 B1 * 8/2001 Hanawa et al. ............... 703/25

FOREIGN PATENT DOCUMENTS

| | | |
|---|---|---|
| DE | 197 09 210 | 10/1997 |
| DE | 197 12 799 | 10/1998 |
| EP | 0 321 628 | 6/1989 |
| EP | 0 409 330 | 1/1991 |
| EP | 0 649 096 | 4/1995 |

* cited by examiner

*Primary Examiner*—Tuan V. Thai
(74) *Attorney, Agent, or Firm*—Shaw Pittman LLP

(57) ABSTRACT

Using an allocation function (ZF) within at least one central control unit (ST) that controls the communication and the data exchange between such active units respectively connected to a control unit via a bus interface, particularly at least one microprocessor (CPU) and at least one input/output unit (AE1, AE2), and a memory (SP) connected to a memory unit, such a memory access (ZG1, ZG2) is withdrawn from an active unit and allocated to a different active unit no later than the point in time at which the last command (PRECHARGE1) of the current memory access cycle is directed to the memory from a control unit connected to the memory.

17 Claims, 6 Drawing Sheets

CPU
AE2
ZF
ST
SP
REQ 1
ZG1
HOLD
REQ 2
D1
ACK
ZG2
D2
PRECHARGE 1
1CLOCK
TIME

ACTIVE INPUT/OUTPUT UNIT
AE1
ACTIVE INPUT/OUTPUT UNIT
AE2
MICRO-PROCESSOR
CPU
ST
CONTROL UNIT
MEMORY UNIT
SP
PE1
PE2
PASSIVE INPUT/OUTPUT UNIT
PASSIVE INPUT/OUTPUT UNIT

SP
ST
ZF
AE2
CPU
REQ 1
ZG1
INFO1
INFO2
PRECHARGE 1
REQ 2
EOT
ZG2
D1
D2
READY1
READY2
TIME

METHOD FOR CONTROLLING THE ASSIGNMENT OF MEMORY ACCESS

BACKGROUND OF THE INVENTION

1. Field of the Invention

The invention is directed to a method for controlling the allocation of a memory access that a plurality of active units of an assembly, particularly at least one microprocessor and at least one input/output unit, request.

2. Description of the Related Art

Controller assemblies are utilized in current communication systems for control purposes, their architecture comprising a central bus, according to the known von Neumann Architecture shown in FIG. 1, which is accessed in common by the units present in the assembly.

By way of example, FIG. 1 shows a central BUS to which a microprocessor CPU, two of a plurality of possible, active input/output units AE1, AE2 and two of a plurality of possible, passive input/output units PE1, PE2 are connected. Furthermore, a memory unit SP is directly connected to the bus and, at the same time, via a preceding control unit ST. Such an active input/output unit such as an ATM protocol module, has its own controller that actively sends control signals, addresses and/or data to the shared memory or receives them from the shared memory. In contrast to this, the exchange of control signals, addresses and/or data between passive input/output units and the shared memory is controlled via the microprocessor. Such a passive input/output unit can, for example, be a serial V.24 interface that, for example, serves for the connection of an operating terminal.

In order to control the allocation of a memory access between a plurality of active units of an assembly, i.e., for example, a microprocessor CPU and an input/output unit AE2, the previously used method is shown in a flow chart in FIG. 2.

By using vertical lines, FIG. 2 indicates the active units CPU and AE2, the control unit ST, an allocation function ZF integrated in the control unit and the shared memory SP. The time direction of the method is viewed from top to bottom.

In the example illustrated in FIG. 2, the active unit CPU requests the memory access from the allocation function with a request command REQ1. The allocation function grants the active unit CPU memory access ZG1 to the memory. The active units CPU can now direct a command sequence to the memory. The active unit AE2 now requests memory access from the allocation function with a request command REQ2. At approximately the same time, the control unit ST delivers the last command PRECHARGE1 of the command sequence sent from the active unit CPU in the direction of the control unit to the memory. So that the allocation function can now allocate the memory access to the active unit AE2, it switches the active unit CPU inactive with respect to the memory access on the basis of a hold signal. Before the active unit CPU can send an acknowledged signal ACK to the allocation function, the data D1 requested by the previously deposited command sequence must have arrived at the active unit CPU, these data D1 are only capable of being sent from the memory delayed after the arrival of the command sequence. After reception of the acknowledgment signal ACK, the allocation function can assign the memory access ZG2 to the memory SP to the active unit AE2. The active unit AE2 now delivers a command sequence to the memory, after which it receives the requested data D2 after a delay time. This method is disadvantageous insofar as, for a change of the allocation of the memory access, a time loss of at least one clock arises. In the example, at least one clock after the acknowledgment signal ACK up to the allocation of the memory access ZG2 to the memory to the active unit AE2 is not used. On the controller assembly, the microprocessor and the active input/output units constantly access the shared memory, so that the time loss when changing the allocation to the memory access critically influences the performance of the controller assembly.

Additionally, for a frequent change of the allocation of the memory access, the fundamentally present pipeline-like structure of the memory cannot be utilized, i.e., that successive command cycles can be implemented with a time overlap. This disadvantage is particularly illustrated by FIG. 3.

FIG. 3 shows a pipeline processing of the control unit ST. When the memory access is currently allocated to the active unit CPU, the active unit CPU delivers a command sequence B1 to the memory within a memory access cycle. One command of the command sequence is executed per clock of the memory access cycle. FIG. 3 shows such a command sequence having, for example, six commands 11 through 16. A datum of the data sequence D1 that is referenced 21 through 26 and that corresponds to a command is received by the control unit with an at least one-clock delay after implementation of the command. It is also shown that an allocation of the memory access to the active unit AE2 can only ensue after the acknowledgment signal ACK of the active unit CPU. Accordingly, the command sequence 31 through 36 of the active unit AE2 can only be executed one clock after allocation of the memory access. The corresponding case as for the data sequence D1 having the data 21 through 26 applies to the data sequence D2 having the data 41 through 46.

As presented in FIG. 3, the pipeline-like structure of the control unit, which serves for fast command execution, cannot be utilized. Additionally, as mentioned above, a time loss always arises with every change of the allocation of the memory access, since the memory access cycle of the first active unit, for example CPU, must be ended, the allocation of the memory access must then be given to the second active unit, for example AE2, and only then can the second active unit start the memory access cycle.

Due to these disadvantages, the performance capability of such a controller assembly is critically deteriorated.

A similar architecture is shown in FIG. 1 of European Patent Application EP 0 321 628 A1. Given this architecture, the "memory user devices" 1 and 2 comprise shared control, address and data bus lines leading to the "memory controller". In order to enable a pipeline processing of the commands directed to the memory, specific, separate control, address and data lines are additionally present between the respective "user device" and the "memory controller" unit. One disadvantage in this architecture is that, when processing the command sequence directed to the memory, a blockage-free address or data stream on the shared control, address or data bus lines must remain in consideration so that an optimization of the processing of the command sequence has limits placed on it.

SUMMARY OF THE INVENTION

The object of the invention is to provide a method for controlling the allocation of a memory access to the effect that a further performance enhancement of an assembly described above can be achieved.

This object is achieved by a method for controlling an allocation of a memory access that a plurality of active units of an assembly request, comprising the steps of withdrawing the memory access, by an allocation function within a control unit that controls communications and the data exchange between such active units respectively connected to such a control unit via a bus interface and a memory connected to the control unit via a bus interface, from an active unit to which the memory access is currently allocated; allocating the memory access to another active unit requesting a memory access no later than a point in time at which a last command of a current memory access cycle is directed to the memory by the control unit connected to the memory; and receiving, by each active unit, a message from the control unit with respect to the last command of the current memory access cycle directed to the memory.

The principle underlying the invention is comprised in advancing the point in time in which an allocation function integrated in a central control unit withdraws such a memory access from an active unit to which the memory access is currently allocated and assigns it to another active unit requesting the memory access. This is done to the extent that the last command of the current memory access cycle has already been delivered to the memory by the control unit connected to the memory and every active unit has received a message with respect to the last command of the current memory access cycle directed to the memory. The inventive method, however, assumes an arrangement of the units on an assembly in such a way that at least one central control unit controls the communication and the data exchange between such active units respectively connected to a control unit via a bus interface and a memory connected to a control unit. Such active units are, in particular, at least one microprocessor and at least one input/output unit.

Due to the fact that the change of the allocation of memory access is already initiated no later than at the point in time of the last command directed to the memory, what is achieved is that the memory access smoothly switches from one active unit to another without time losses.

According to an advantageous development of the invention, the active unit from which the currently allocated memory access is allowed to be withdrawn sends a corresponding message to a control unit at that point in time after a message with respect to the last command of the current memory access cycle directed to the memory has arrived at it. What is thus achieved is that it is not only the control unit that decides by itself above the allocation of memory access but that additional information from the active units can enter into the decision of the control unit.

According to another development of the invention, all requests of the active units for allocation of the memory access are stored in a control unit, and the subsequently allocation of the memory access is successively received by the requesting, active units.

The allocation of a memory access to the requesting active units can also be implemented according to the priority of the request in conformity with a development of the invention.

By storing all requests of the active units and the sequence of the allocation of the memory access, the control unit is supported in the pipeline processing of memory accesses, i.e., successive memory access cycles are implemented with a time overlap.

A next development of the invention provides that a memory access cycle be ended in that an active unit to which the memory access has been allocated at the beginning of the memory access cycle receives an individual message for the reception of data from the memory. This favors the situation that—when the control unit has directed the last command to the memory—the allocation function can already assign the memory access to another active unit before the active unit to which the memory access was most recently allocated has the requested data available to it. At that point in time in which the data are available, the active unit therefore receives an individual message for the reception of the data from the memory. In other words, such a message is individually directed to the active unit requesting the data. The data thus arrive at the active unit that previously requested the data even though the active unit may potentially already have had the memory access withdrawn from it.

BRIEF DESCRIPTION OF THE DRAWINGS

An exemplary embodiment of the invention is described in greater detail below with reference to the drawings.

DESCRIPTION OF THE PREFERRED EMBODIMENTS

Figure 1:
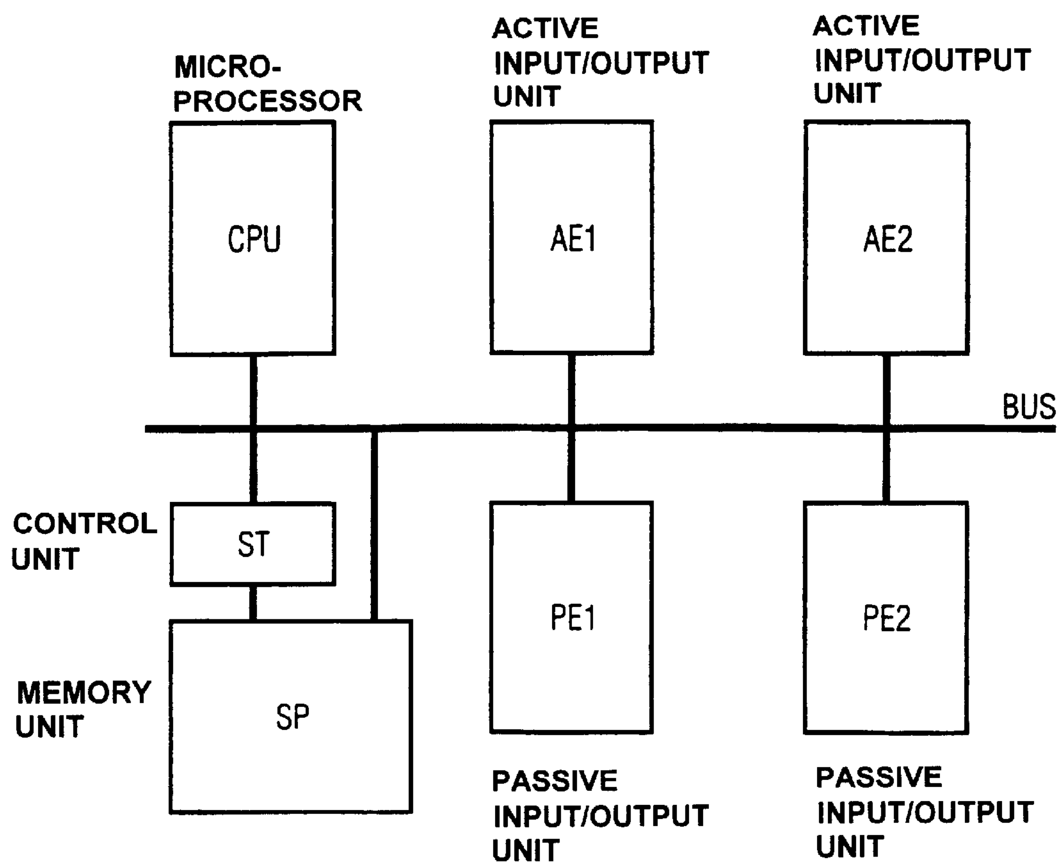
FIG. 1 is a block diagram of a known controller assembly according to the known von Neumann Architecture.
Figure 4:
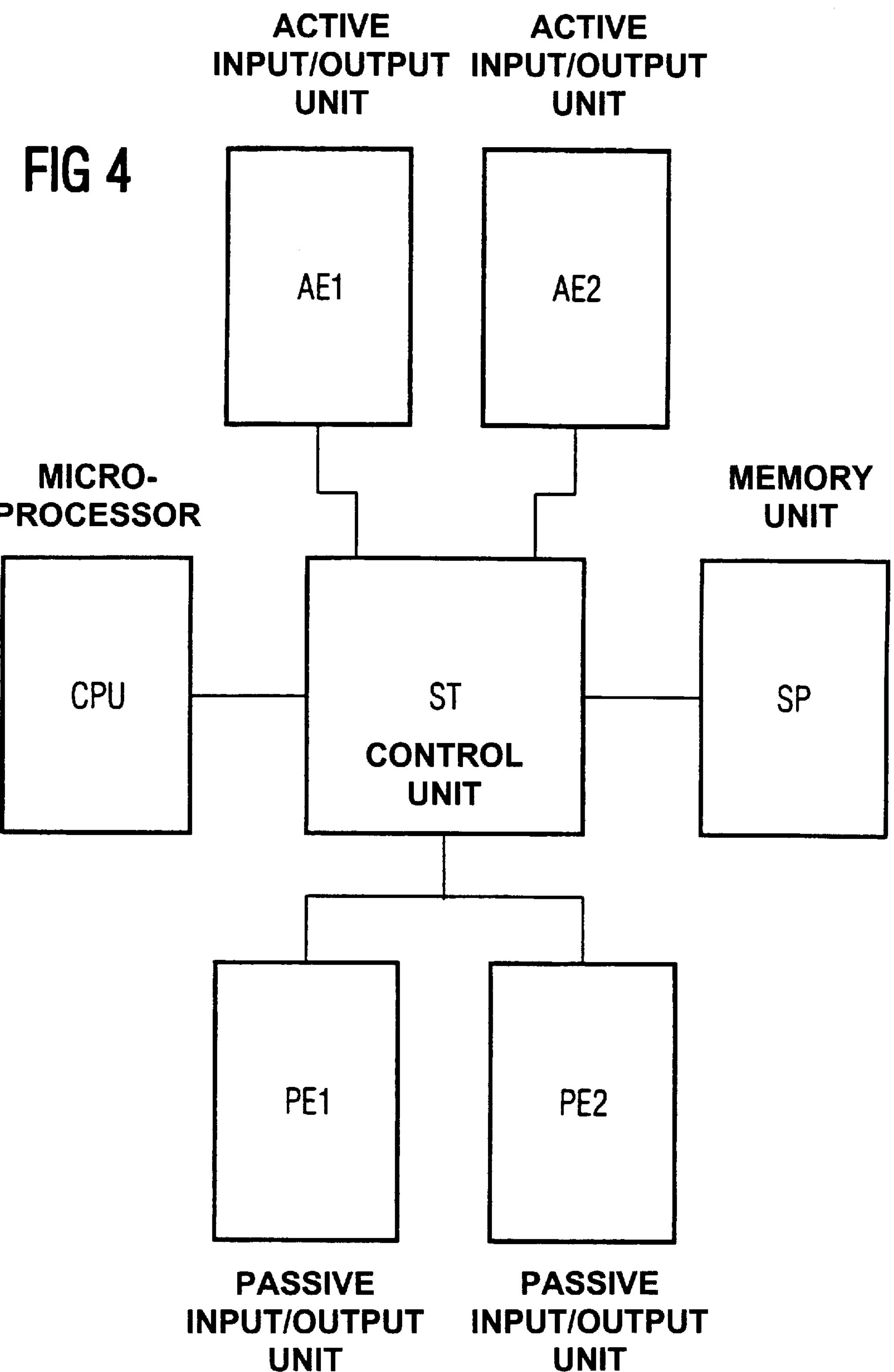
FIG. 4 is a block diagram of the architecture of the units arranged on the inventive assembly.

FIG. 4 shows the architecture of such an assembly on which, for example, a central control unit ST is arranged. A microprocessor CPU, a memory SP, active input/output units, for example AE1 and AE2, as well as passive input/output units, for example PE1 and PE2, are connected via separate buses to the central control unit. The functionalities of the units CPU, SP, AE1, AE2, PE1, PE2 correspond to the functionalities of the initially cited units of FIG. 1.

Alternately, the units CPU, SP, AE2, PE1, PE2 on such an assembly may each be respectively connected to their own control unit. These control units allocated: to the units are connected to one another. These control units communicate with one another as to which active unit has been granted the memory access. The functionality of the allocation function is thus divided onto the respective control units. The coordination then takes place by the exchange of control messages.

Figure 2:
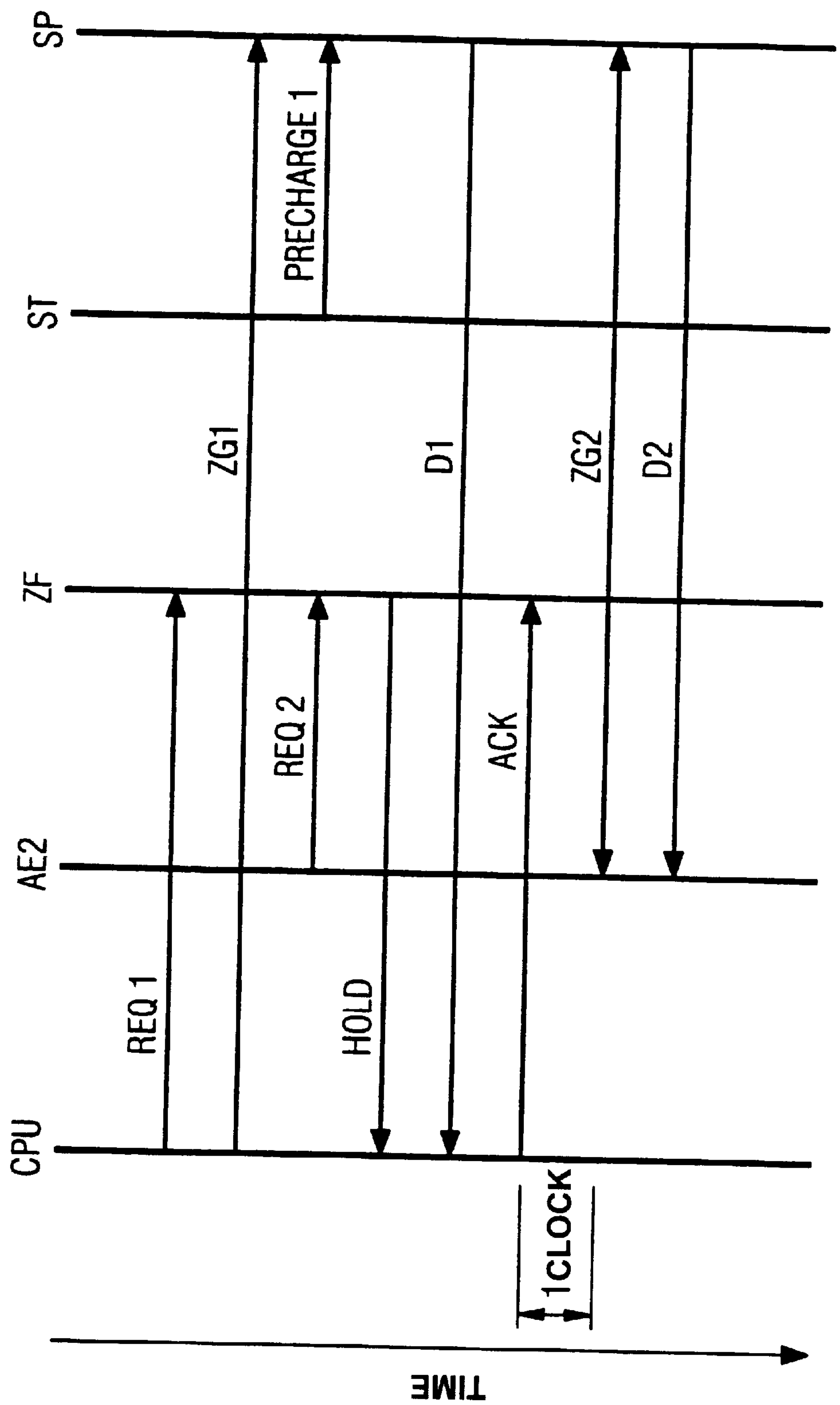
FIG. 2 is sequence flow chart showing known method for controlling the allocation of a memory access.
Figure 5:
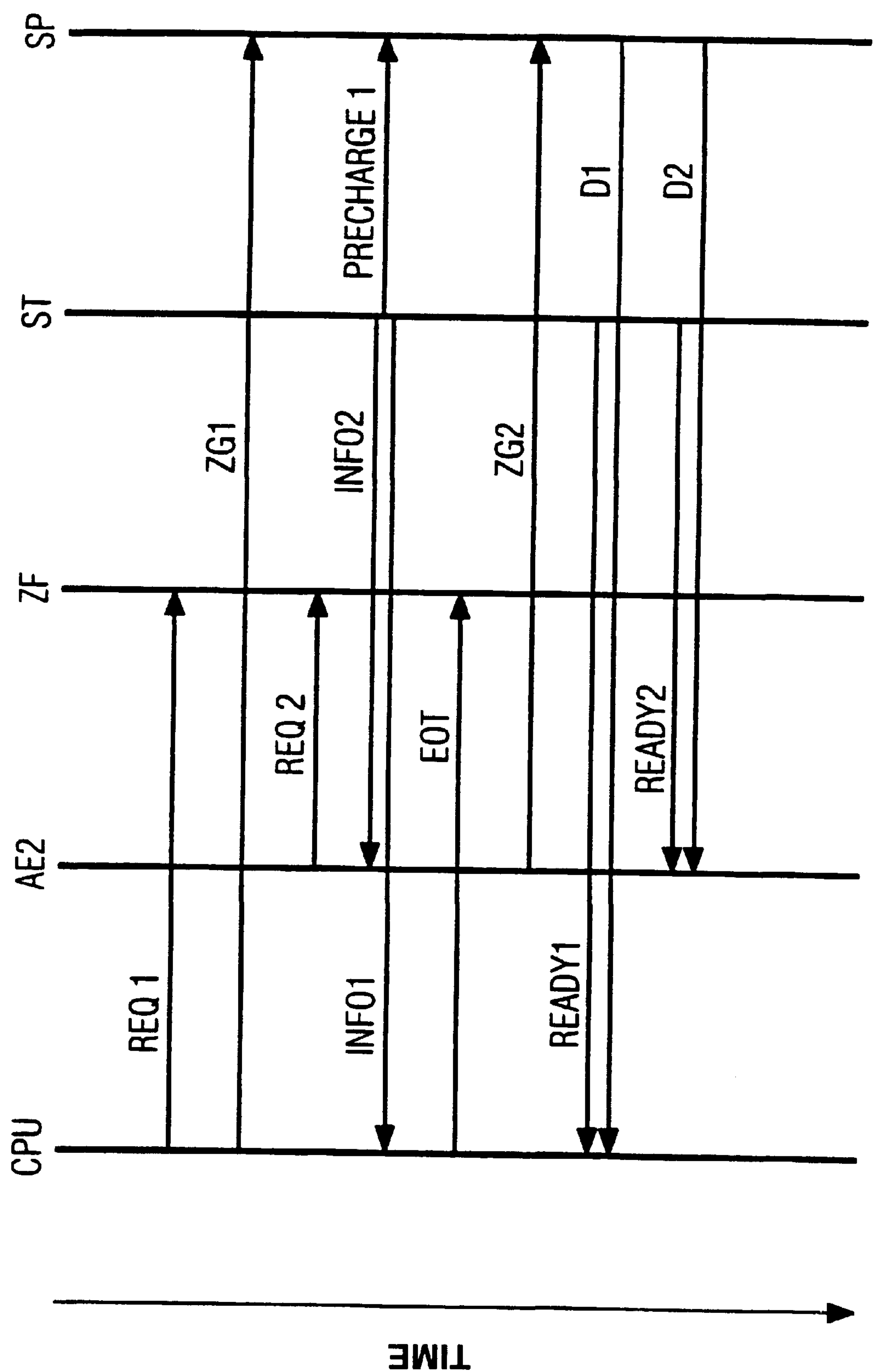
FIG. 5 is a sequence flow chart showing the inventive allocation of the memory access.

The manner of presentation of the flow chart of FIG. 5 essentially corresponds to that of FIG. 2. An active unit CPU requests an allocation of the memory access from the allocation function ZF with a request command REQ1. In response to this request, the allocation function assigns the memory access ZG1 to the active unit CPU. An active unit, for example AE2, likewise requests the allocation of the memory access from the allocation function with a request command REQ2. At the point in time at which the control unit ST delivers the last command PRECHARGE1 to the memory, it sends a corresponding message INFO1 or INFO2 to the active units CPU and AE2. When the active unit CPU can be interrupted, it forwards this received message, linked with further information, to the allocation function as end-of-transfer message EOT. Subsequently, the active unit AE2 is granted the memory access ZG2 to the memory SP delay-free, even though the active unit AE1 has not yet received the data D1 corresponding to the memory access ZG1. At the point in time at which the date D1 are available, the control unit sends a ready signal READY1 to the active unit CPU via an individual control line (not shown in the Figure). The memory contemporaneously sends the data D1 to the active unit CPU. When the data D2 are available afterwards, the control units sends a ready signal READY2 to the active unit AE2 via an individual control line (not shown). Contemporaneously, the memory then communicates the data D2 to the active unit AE2. It is assured in this way that the data D1 and D2 proceed to the correct addressees.

The request commands REQ1, REQ2 sent from the active units CPU and AE2 to the allocation function are stored in the control unit and successively initiate the allocation function to implement the allocation of the memory access to the active units CPU and AE2 according to the priority of the request commands REQ1, REQ2.

Before a write access onto the memory, the data to be processed are first read from the memory in the above-described way. Subsequently, the data are processed by an active unit, for example CPU, and, finally, are written back into the memory. The data are thus available at the beginning of a writing memory access cycle.

Figure 3:
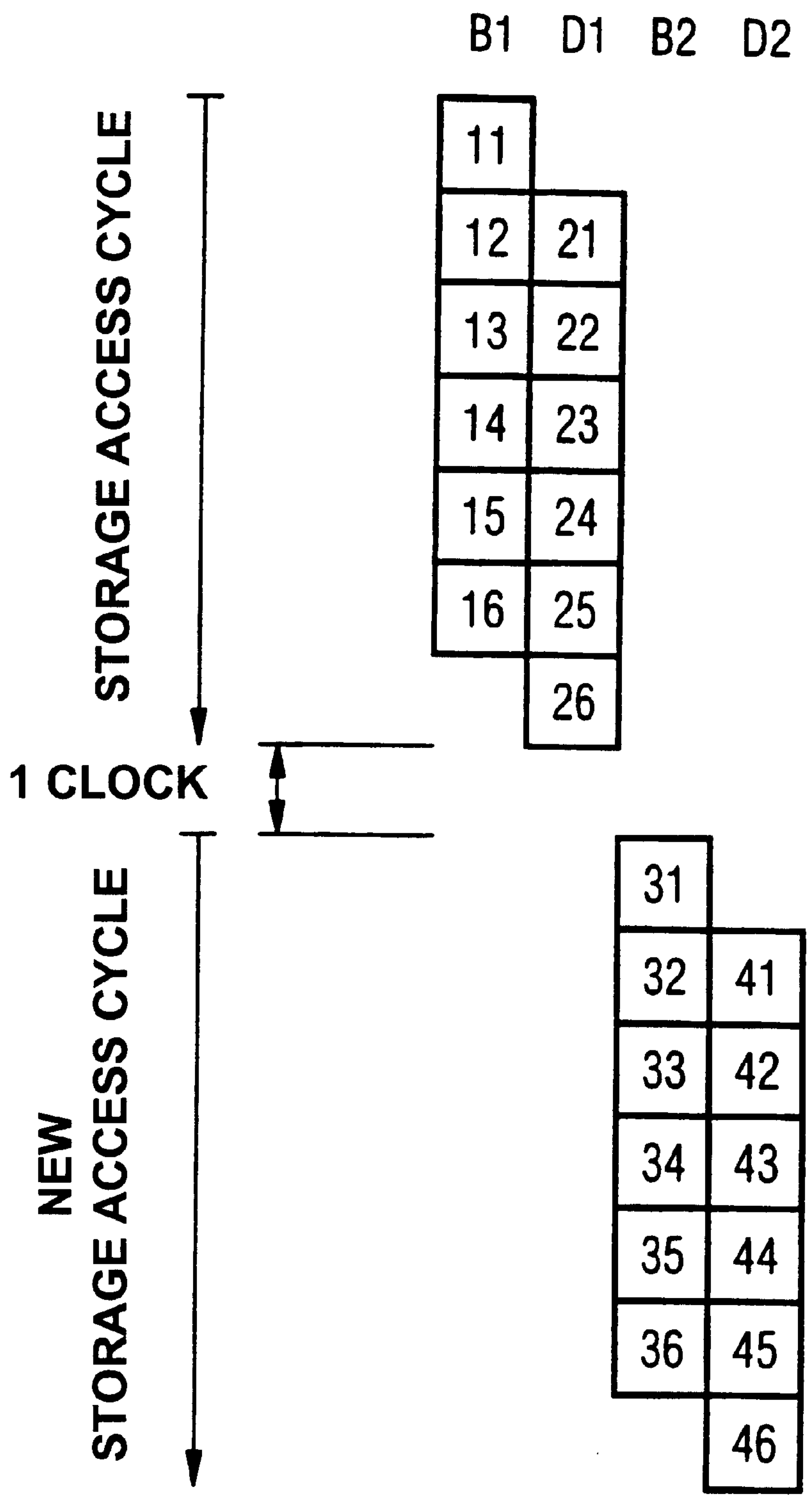
FIG. 3 is a sequencing diagram showing the known pipeline processing of the control unit.
Figure 6:
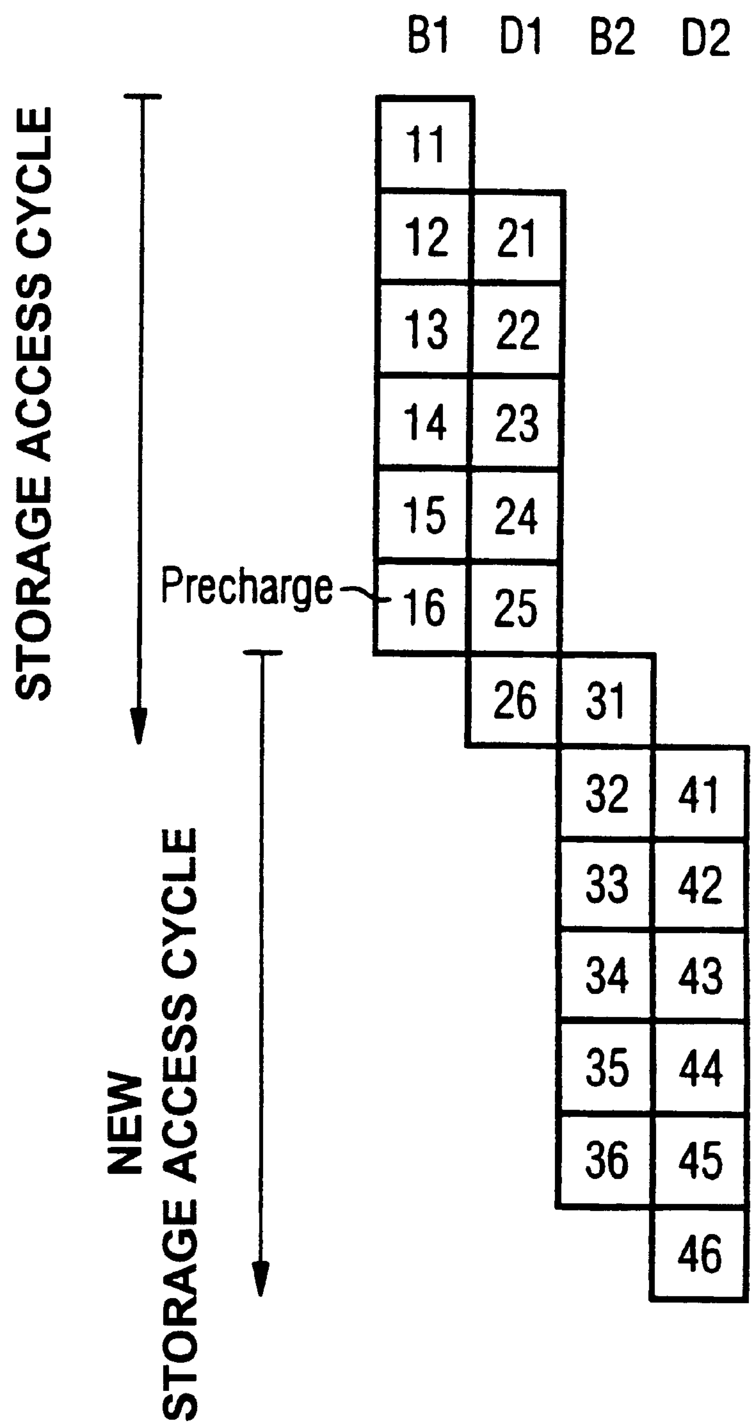
FIG. 6 is a sequencing diagram showing the inventive pipeline processing of a control unit.

The type of presentation selected in FIG. 6 largely corresponds to that of FIG. 3 in that the pipeline processing of the control unit ST is outlined. Differing from FIG. 3, the memory access cycle of the active unit AE2 in FIG. 6 begins immediately in the following clock after delivery of the last command 16 (PRECHARGE1). This is indicated in that the last datum 26 of the data sequence D1 is sent to the active unit CPU in the same clock wherein the first command 31 is executed by the control unit. The command sequences B1 and B2 can thus be smoothly implemented following one another without a time loss.

The above-described method is illustrative of the principles of the present invention. Numerous modifications and adaptations thereof will be readily apparent to those skilled in this art without departing from the spirit and scope of the present invention.

What is claimed is:

1. A method for controlling an allocation of a memory access among a plurality of active units of an assembly, comprising the steps of:

receiving a request for memory access by a second active unit at an allocation function in a control unit that controls communications and data exchange between active units and a memory, each respectively connected to the control unit, wherein memory access is currently allocated to a first active unit; and reallocating memory access from the first active unit to the second active unit and sending messages from said control unit to both active units no later than a point in time at which a last command of a current memory access cycle is directed to said memory by said control unit connected to said memory.

2. The method according to claim 1, further comprising the step of:

sending by said first active unit a corresponding message to said control unit at a point in time after a message with respect to said last command of the current memory access cycle directed to the memory has arrived at it.

3. The method according to claim 1, further comprising the steps of:

storing all requests from active units for allocation of a memory access in said control unit; and selectively receiving by said requesting active units an allocation of said memory access.

4. The method according to claim 3, wherein said allocation of said memory access to said requesting active units is implemented according to a priority of said request.

5. The method according to claim 1, further comprising the step of:

resuming a memory access cycle once said first active unit receives an individual message for reception of data from said memory.

6. The method according to claim 1, wherein said plurality of active units of said assembly comprise at least one microprocessor, and at least one input/output unit.

7. The method according to claim 1, wherein said assembly further comprises additional control units.

8. The method according to claim 1, wherein memory access is provided to the second active unit before data is transmitted or received between the first active unit and the memory.

9. The method according to claim 1, wherein memory access is provided to the second active unit immediately upon receiving a control signal from the first active unit to the control unit.

10. The method according to claim 1, wherein the messages to the first and second active units are sent nearly simultaneously with the last command.

11. The method according to claim 1, wherein the messages to the first and second active units are sent from different outputs of the control unit.

12. The method according to claim 1, wherein the messages to the first and second active units are transmitted along two different sets of control lines.

13. A method for controlling allocation of memory access among a plurality of active units, comprising:

receiving requests for memory access by active units at an allocation function in a control unit that controls communications and data exchange between active units and a memory, each respectively connected to the control unit through a separate connection at the control unit, wherein memory access is currently allocated to an active unit; and reallocating memory access from the active unit to which said memory access is currently allocated to a requesting active unit and sending allocation messages from said control unit to the requesting active unit and to the active unit to which said memory access is currently allocated no later than a point in time at which a last command of a current memory access cycle is directed to said memory by said control unit connected to said memory.

14. The method according to claim 13, wherein memory access is withdrawn from the active unit to which memory access is currently allocated prior to receiving memory data at the active unit.

15. The method according to claim 13, wherein the allocation messages to the two active units are transmitted within the same clock cycle.

16. The method according to claim 14, wherein the allocation messages are transmitted along different sets of control lines.

17. The method according to claim 13, wherein the allocation messages are transmitted nearly simultaneously.

* * * * *

UNITED STATES PATENT AND TRADEMARK OFFICE

CERTIFICATE OF CORRECTION

PATENT NO. : 6,598,138 B1
DATED : July 22, 2003
INVENTOR(S) : Marik et al.

It is certified that error appears in the above-identified patent and that said Letters Patent is hereby corrected as shown below:

Title page,
Item [54], Title, "METHOD FOR CONTROLLING THE ASSOCIATION OF A MEMORY CLASS" should read -- METHOD FOR CONTROLLING THE ALLOCATION OF A MEMORY CLASS --

Signed and Sealed this

Fourteenth Day of October, 2003

JAMES E. ROGAN
*Director of the United States Patent and Trademark Office*